(12) United States Patent
Xie et al.

(10) Patent No.: US 7,313,269 B2
(45) Date of Patent: Dec. 25, 2007

(54) UNSUPERVISED LEARNING OF VIDEO STRUCTURES IN VIDEOS USING HIERARCHICAL STATISTICAL MODELS TO DETECT EVENTS

(75) Inventors: Lexing Xie, New York, NY (US); Ajay Divakaran, Burlington, MA (US); Shih-Fu Chang, New York, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 783 days.

(21) Appl. No.: 10/734,451

(22) Filed: Dec. 12, 2003

(65) Prior Publication Data

US 2005/0131869 A1 Jun. 16, 2005

(51) Int. Cl.
*G06K 9/62* (2006.01)
(52) U.S. Cl. .................. 382/159; 704/256.1; 704/256.2
(58) Field of Classification Search ................ 382/159, 382/164, 165, 190–195; 700/47; 704/256.1–256.8; 706/FOR. 106
See application file for complete search history.

(56) References Cited

U.S. PATENT DOCUMENTS

| 5,828,809 | A | | 10/1998 | Chang et al. ................. 386/69 |
| 6,012,052 | A | * | 1/2000 | Altschuler et al. ............. 707/2 |
| 7,076,102 | B2 | * | 7/2006 | Lin et al. ..................... 382/218 |
| 2002/0042793 | A1 | * | 4/2002 | Choi ............................. 707/6 |
| 2002/0061136 | A1 | * | 5/2002 | Shibata et al. .............. 382/199 |

| 2004/0120581 | A1 | * | 6/2004 | Ozer et al. .................. 382/224 |
| 2005/0176057 | A1 | * | 8/2005 | Bremer et al. .................. 435/6 |

FOREIGN PATENT DOCUMENTS

DE 10122212 C1 * 10/2002 ............... 704/256.2

OTHER PUBLICATIONS

Xie et al., "Structure analysis of soccer video with hidden Markov models," Proc. International Conference on Acoustic, Speech and Signal Processing (ICASSP), 2002.*
Rabiner, "A tutorial on hidden Markov models and selected applications in speech recognition," Proceedings of the IEEE, vol. 77, pp. 257-285, Feb. 1989.
Wang et al., "Multimedia content analysis using both audio and visual clues," IEEE Signal Processing Magazine, vol. 17, pp. 12-36, Nov. 2000.
Xie et al., "Structure analysis of soccer video with hidden Markov models," Proc. International Conference on Acoustic, Speech and Signal Processing (ICASSP), 2002.

(Continued)

*Primary Examiner*—Matthew C. Bella
*Assistant Examiner*—Greg F. Cunningham
(74) *Attorney, Agent, or Firm*—Dirk Brinkman; Clifton D. Mueller; Gene V. Vinokur

(57) ABSTRACT

A method learns a structure of a video, in an unsupervised setting, to detect events in the video consistent with the structure. Sets of features are selected from the video. Based on the selected features, a hierarchical statistical model is updated, and an information gain of the hierarchical statistical model is evaluated. Redundant features are then filtered, and the hierarchical statistical model is updated, based on the filtered features. A Bayesian information criteria is applied to each model and feature set pair, which can then be rank ordered according to the criteria to detect the events in the video.

6 Claims, 3 Drawing Sheets

OTHER PUBLICATIONS

Xie et al., "Learning hierarchical hidden Markov models for video structure discovery," Tech. Rep. 2002-006, ADVENT Group, Columbia University, 2002, Dec. 2002.

Clarkson et al., "Unsupervised clustering of ambulatory audio and video," International Conference on Acoustic, Speech and Signal Processing (ICASSP), 1999.

Langrognet et al., "A Gentle Tutorial on the EM Algorithm and its Application to Parameter Estimation for Gaussian Mixture and Hidden Markov Models," Technical Report, University of Berkeley, ICSI-TR-97-021, 1997.

Husmeier et al., "Bayesian Approaches to Gaussian Mixture Modelling," IEEE Transactions on Pattern Analysis and Machine Intelligence, vol. 20, No. 11, 1133-1142, 1998.

Yeung et al., "Time-constrained clustering for segmentation of video into story units," Proceedings International Conference on Pattern Recognition (ICPR), 1996.

Naphade et al., "Discovering recurrent events in video using unsupervised methods," Proc. Intl. Conf. Image Processing, 2002.

* cited by examiner

UNSUPERVISED LEARNING OF VIDEO STRUCTURES IN VIDEOS USING HIERARCHICAL STATISTICAL MODELS TO DETECT EVENTS

FIELD OF THE INVENTION

This invention relates generally to video analysis, and more particularly to unsupervised learning of video structures to detect events in videos.

BACKGROUND OF THE INVENTION

In order to summarize, browse and index a video, it is necessary to detect and identify structures and events in the video. The structures represent a syntactic composition of the video, and the events represent occurrences of semantic concepts in the video, which are consistent with the structures.

For example, at a lowest level, the structures can be indicated by repeated color schemes, texture patterns, or motion. At a mid level, the structure can be based on repeated camera movement, for example a pans, followed by a close-up. At a high level, the structures can relate to specific state transitions in the video. For example, in a golf video, a tee shot is usually followed by pan following the ball flying through the air until it lands and rolls on the fairway.

The problem of identifying structure has two main parts: finding a description of the structure, i.e., a model, and locating segments in the video that matches the description. Most prior art methods perform these two tasks in separate steps. The former is usually referred to as training, while the latter, is called classification or segmentation.

One possible way to represent the structures is with hidden Markov models (HMMs), see Rabiner, "A tutorial on hidden Markov models and selected applications in speech recognition," Proceedings of the IEEE, Vol. 77, pp. 257-285, February 1989. HMMs are stochastic models with a discrete state-space. HMMs work well for temporally correlated signals, such as videos. HMMs have been successfully applied in many different applications, such as speech recognition, handwriting recognition, and motion analysis in videos.

For videos, different genres in TV programs have been distinguished with HMMs trained for each genre, see Wang et al., "Multimedia content analysis using both audio and visual clues," IEEE Signal Processing Magazine, Vol. 17, pp. 12-36, November 2000. The high-level structure of soccer games, e.g., play versus break, was delineated with a pool of HMMs trained for each category, see Xie et al., "Structure analysis of soccer video with hidden Markov models," Proc. International Conference on Acoustic, Speech and Signal Processing (ICASSP), 2002, U.S. Pat. No. 5,828,809 issued to Chang et al. on Oct. 27, 1998, "Method and apparatus for extracting indexing information from digital video data," where a football game is analyzed.

All of the above methods use what is known as supervised learning. There, important aspects and constraints of the structures and events, if not the structure and events themselves are explicitly identified, and training videos are labeled accordingly to these preconceived notions for the training and classification. That methodology is adequate for specific video genres, at a small scale. However, such methods cannot be extended to the more general case at a large scale.

Therefore, it is desired to use unsupervised learning techniques that can automatically determine salient structures and events in an unlabeled video, without prior knowledge of the genre of the video.

Unsupervised learning has been applied to gene motif discovery and data mining, see Xie et al., "Learning hierarchical hidden Markov models for video structure discovery," Tech. Rep. 2002-006, ADVENT Group, Columbia University, 2002, December 2002, and U.S. patent application Ser. No. 20030103565, Xie et al., "Structural analysis of videos with hidden Markov models and dynamic programming," filed Jun. 5, 2003.

Clustering techniques have been applied to key frames of shots to discover the story units in a TV drama. However, temporal dependencies of the video were not formally modeled, see Yeung et al., "Time-constrained clustering for segmentation of video into story units," Proceedings International Conference on Pattern Recognition (ICPR), 1996.

Left-to-right HMMs have been stacked into a large HMM in order to model temporally evolving events in videos, see Clarkson et al., "Unsupervised clustering of ambulatory audio and video," International Conference on Acoustic, Speech and Signal Processing (ICASSP), 1999, and Naphade et al., "Discovering recurrent events in video using unsupervised methods," Proc. Intl. Conf. Image Processing, 2002.

Therefore, there is a need for a method for automatically determining a structural model of a video, and detecting semantic events in the video that are consistent with the model.

SUMMARY OF THE INVENTION

In a video, structure defines repetitive segments with consistent deterministic or stochastic characteristics. While most prior art method use supervised learning, in separate steps, the invention uses a single unsupervised statistical method. That is, the method is entirely driven by the signal in the video itself, without a preconceived notion of what the content of the video might be. Thus, as an advantage, the invention can be applied to any video.

The unified method when applied to a video concurrently determines statistical descriptions of structures and locates segments containing events that match the structures. The invention represents multilevel statistical structures of videos as hierarchical statistical models, and provides efficient procedures for learning both the model and parameters of the model. The hierarchical models can be hierarchical hidden Markov models (HHMM) or hierarchical Gaussian mixture models (HGMM).

When applied to a video, the unsupervised learning method according to the invention can be more accurate than a comparable supervised method that has knowledge of the content.

DETAILED DESCRIPTION OF THE PREFERRED EMBODIMENT

Figure 1:
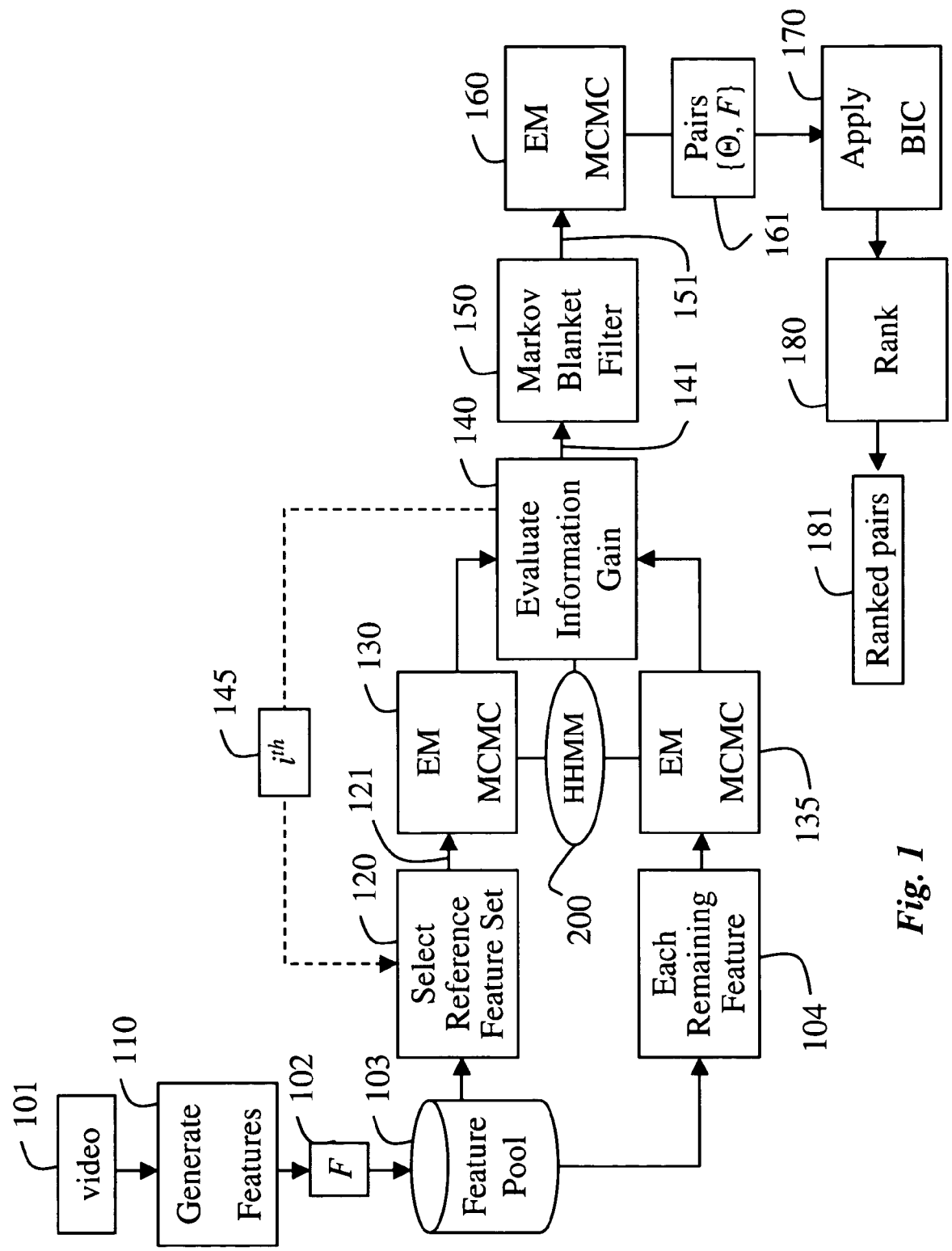
FIG. 1 is a flow diagram of the unsupervised learning method according to the invention.

As shown in FIG. 1, our invention uses unsupervised learning to determine a structure of a video 101, i.e., an audio-visual stream. Knowing the structure, we can detect events in the video that are consistent with the structure. The structure is in the form of a hierarchical statistical model 200, see FIGS. 2-3. The hierarchical model can be based on hierarchical hidden Markov models (HHMM) or hierarchical Gaussian mixture models (GHMM).

Our invention is based on an observation that the video 101 has the following properties. The structure of the video is in a discrete state space, because we understand the video in terms of concepts. We assume there is a small set of concepts in a given video genre or domain. Features 102 of the video are stochastic because various segments of the video seldom have exactly the same features, even when the segments are conceptually similar. The features of the video are highly correlated in time because most videos are sampled at a rate much higher than changes in the scene, e.g., 30 or 60 frames per second.

We use the term 'structure' to emphasize the statistical characteristics in the features. Given specific video domains, such statistic structures often correspond to events, which represent occurrences of objects, or changes of the objects or the scene depicted in the video.

In particular, we focus on dense video structures. By dense, we refer to the case where constituent structures are modeled as a common parametric class. Representing their alternation is sufficient for describing the entire video. In this way, there is no need for an explicit background class, which may or may not be of the same parametric form, to distinguish sparse events from the majority of the background in the video.

Based on the above properties, we model stochastic observations in a temporally correlated discrete state space and adopt a few weak assumptions to facilitate efficient processing. Within each event, states are discrete and can be low-level hidden Markov models. Observations are associated with states under a fixed parametric form, usually Gaussian. We model transitions of events as a Markov chain at a higher level. This simplification enables efficient processing at a small cost to the power of the model.

We model temporal dependencies and a generic structure of events in the video in a unified statistical framework. We model recurring events in the video as the hidden Markov models (HMMs), and the higher-level transitions between these events as a higher level Markov chain.

This hierarchy of HMMs forms the hierarchical hidden Markov model (HHMM) 200 according to the invention. The hidden state inference and parameter estimation can be learned and evaluated using an expectation-maximization (EM) process 130. Our method is general in that it is scalable to events of different complexity. The method is also flexible in that prior domain knowledge can be incorporated in terms of state connectivity, number of levels of Markov chains, and the time scale of the states. However, it is noted that the method operates correctly without a priori domain knowledge.

It should be noted, the statistical hierarchical model can also be in the form of other Baysian classifiers, such as a Gaussian mixture model. In a Gaussian mixture, each observation is assumed to arise independently from a mixture of d-dimensional Gaussian densities having means $\mu_k$ and variances matrix $\Sigma_k$. Such a Bayesian-based methodology automatically penalizes over-complex models fitted to unknown data, as is the case here. With the Gaussian mixture model, an 'optimal' number of components in the model are selected to partition the data set, see Langrognet et al., "A Gentle Tutorial on the EM Algorithm and its Application to Parameter Estimation for Gaussian Mixture and Hidden Markov Models," Technical Report, University of Berkeley, ICSI-TR-97-021, 1997, Husmeier et al., "Bayesian Approaches to Gaussian Mixture Modelling," IEEE Transactions on Pattern Analysis and Machine Intelligence, Vol. 20, No. 11, 1133-1142, 1998.

We also provide a process for selecting an appropriate set of features to be extracted. This is necessary in an unsupervised setting where domain knowledge is not used. Bayesian learning techniques are used to learn the model complexity. The search over the model space is done with a reverse-jump Markov chain Monte Carlo (MCMC) method. A Bayesian information criteria (BIC) 170 is applied as a posterior probability of the our model.

For feature selection, we use an iterative filter-wrapper method, where a wrapper step partitions the set of all possible features 103 into consistent subsets that agree with each other according to a mutual information gain criteria. A filter step 150 eliminates redundant dimensions in each subset of features by finding an approximate Markov 'blanket', i.e., the parent, sibling and child nodes of a particular node. Markov blankets are well known, and described in detail below. EM/MCMC 160 is applied to the remaining features as before, and the resulting subsets are ranked 180 according to the modified BIC 170 with respect to their a posteriori fitness.

The method according to our invention is elegant in that the maximum likelihood (ML) parameter estimation, model and feature selection, structure decoding, and content segmentation are done in a single unified process.

Feature Pool

As a preliminary step, features 102 are generated 110 from the video 101, e.g., dominant color ratios, motion intensity, camera translation, audio volume, etc. The generated features can also be learned from the content of the video.

The generated features 102 are stored in a feature pool 103 as a set of all possible features $F=\{f_1, \ldots, f_D\}$. If the data sequence is $X_F=X_F^{kT}$, then a feature vector at time t is $X_F^t$, with the iterations indicated by i.

Feature Selection

The set of all possible features and potential feature extraction schemes for audio-visual streams is very large. The problem is to determine just the subset of features that are relevant to the structure and events that are learned from this particular video 101.

Certainly, few features can be selected manually when there is adequate domain knowledge. Yet, very often, such knowledge is not available in new domains, or the relationship between the features and the model structures are non-obvious for a particular video.

Feature selection has two tasks, eliminating irrelevant features and eliminating redundant features because the set of all possible features can be quite large. Irrelevant features degrade classification accuracy, while redundant features add to computational cost without generating new information. Furthermore, for unsupervised structure discovery, different subsets of features may relate to different events. Thus, the events should be described with separate models rather than being modeled jointly. Hence, the scope of our problem is to select a relevant and compact subset of feature that fits the HHMM model 200 over the temporally a correlated data stream 101.

Therefore, during each $i^{th}$ round, first select 120 a set of reference features $F_i$ 121 at random from the feature pool 103. Also, learn 130 the HHMM $\Theta_i$ 200 on $\overline{F}_i$, using expectation maximization (EM) and a Markov chain Monte Carlo (MCMC) method. Perform Viterbi decoding of $X_{\overline{F}i}$, and obtain a reference state-sequence $\tilde{Q}_i$.

For each remaining feature $f_d$ 104 in the feature pool 103, learn the HHMM $\Theta_d$, again using EM and MCMC 135, obtain the Viterbi state sequence $Q_d$, and determine a partitioning of the reference set, i.e., a reference partition.

Then, we evaluate 140 the information gain of each remaining feature on the state sequence $Q_d$ with respect to the reference state sequence $\tilde{Q}_i$. If the proposed model increases an information gain test, then it is accepted as the new current model. As part of the acceptance, a decision step determines an acceptance probability $\alpha$ based on the fitness of the proposed model using model posterior and proposal strategies. The proposed model is then accepted or rejected with probability $\alpha$. Rejected features remain in the feature pool 103.

Then, we find the subset $\hat{F}_i$, feature group 141, with significantly large information gain to form a consistent feature group as union of the reference set and the relevance set $\overline{F}_i$. We also update the HHMM model 200 for the set of features.

We eliminate a previous candidate set by resetting the feature pool, and reiterate 145 for i=i+1, if there are more features to process, i.e., the feature pool is not empty.

Markov blanket filtering 150 is used to eliminate redundant and irrelevant features within the final relevance set $\overline{F}_i$, whose Markov blanket exists.

We are left with a relevant and compact feature subset $F_i$ 151. We learn 160 the HHMM $\Theta_i$ 200 as before with model adaptation on $X_{Fi}$, and store the model and sets of features as pairs $\{\Theta, X_{Fi}\}$ 161.

For each model-feature pair $\{F_i, \Theta_i\}$ 161, we evaluate 170 the pair's fitness by applying the normalized BIC. Then, we rank 180 the feature subsets and interpret the meanings of the resulting ranked pairs 181.

Evaluating Information Gain

The above process produces a reference labeling of the data sequence induced by the classifier learned over the reference feature set. We want to find features that are relevant to this reference. One suitable measure that quantifies the degree of agreement of each feature to the reference labeling is the mutual information, or the information gain achieved by the new partition induced with the candidate features over the reference partition.

The information gain of feature $f$ with respect to $\tilde{Q}_i$ is defined as the mutual information between $\tilde{Q}_i$ and $Q_f$ $$P_{Q_f}(i) = \frac{|\{t|Q_f^t = i, t = 1, ...T\}|}{T};$$

$$P_{\tilde{Q}_i|Q_f}(i, j) = \frac{|\{t \mid \tilde{Q}_i^t, Q_f^t) = (i, j), t = 1, ..., T\}|}{|\{t \mid Q_f^t = j, t = 1, ...T\}|};$$

$$I(Q_f; \tilde{Q}_i) = H(P_{\tilde{Q}_i}) - \sum_j P_{Q_f} \cdot H\left(P_{\tilde{Q}_i|Q_{f=j}}\right)$$

where $i, j = 1, ..., N$

Here $H(\cdot)$ is an entropy function. Intuitively, a larger information gain for a candidate feature $f$ suggests that the $f$-induced partition $Q_f$ is more consistent with the reference partition $\tilde{Q}_i$. After computing 140 the information gain $I(Q_f; \tilde{Q}_i)$ for each remaining featured $f_d$, we perform hierarchical agglomerative clustering on the information gain vector using a dendrogram.

We examine the top-most link that partitions all the features into two clusters, and pick features that are in the upper cluster as the set with satisfactory consistency with the reference feature set.

Markov Blanket

After wrapping information gain criteria around classifiers build over all feature candidates, we are left with a subset of features with consistency, yet also possible redundancy. The approach for identifying redundant features relates to the conditional dependencies among the features. For this purpose, we filter 150 using a Markov blanket. If $f$ is a feature subset, and $M_f$ is a set of random variables that does not contain $f$, then $M_f$ is the Markov blanket of $f$, if $f$ is conditionally independent of all variables in $\{F \cup C\}\backslash\{M_f \cup f\}$ given $M_f$.

Computationally, a feature $f$ is redundant when the partition C of the data set is independent of $f$ given its Markov Blanket $F_M$. In the prior art, the Markov blanket is generally identified with an equivalent condition that the posterior probability distribution of the class, given the feature set $\{M_f \cup f\}$, should be the same as the probability distribution conditioned only on the Markov blanket $M_f$, i.e., $$\Delta_f = D(P(C|M_f \cup f)\|P(C|M_f)) = 0,$$

where $D(P\|Q)$ is the Kullback-Leibler distance between two probability mass functions $P(x)$ and $Q(x)$.

However, this criterion cannot readily be employed for unsupervised learning over a temporal stream. This is because the posterior distribution of a class depends not only on the current data sample but also on samples 'adjacent' in time.

We would have to condition the class label posterior over all dependent feature samples, and such conditioning makes the estimation of the posterior probability intractable as the number of conditioned samples grows. We do not have enough data to estimate these high-dimensional distributions by counting over feature-class tuples because the dimensionality is too high.

Therefore, we use an alternative necessary condition. Our condition requires that the optimum state-sequence $C_{1:T}$ does not change, conditioned on only observing $M_f \cup f$ or $M_f$. Sequentially removing features one at a time, with its Markov blanket identified, does not cause divergence of the resulting set, because if we eliminate feature $f$ and keep its Markov blanket $M_f$, feature $f$ remains unnecessary in later stages when more features are eliminated.

In practice, few if any features have a Markov Blanket of limited size. Therefore, we sequentially remove features that induce the least change in the state sequence given the change is small enough, e.g., less than 5%. Note this step is a filtering step in our HHMM learning setting, because we do not need to retrain the HHMMs for each candidate feature $f$ and its Markov blanket $M_f$.

Given the HHMM trained over the set $f \cup M_f$, the state sequence $Q_{Mf}$, which is decoded only with the observation sequences in $M_f$, is compared with the state sequence $Q_{f \cup Mf}$, which is decoded using the entire observation sequence in $f \cup M_f$. If the difference between $Q_{Mf}$ and $Q_{f \cup M_f}$ is less than a predetermined threshold, then feature $f$ is removed because $M_f$ is found to be a Markov blanket of feature $f$.

Normalized BIC

Iterating over steps of the feature selection process results in disjoint small subsets of features $\{F_i\}$ that are compact and consistent with each other. The HHMM models $\{\Theta_i\}$ learned over these subsets are best-effort fits on the features, yet the models $\{\Theta_i\}$ may not fit the multi-level Markov assumptions for the characteristics of the desired video structure described above.

There are prior art possible distance measures for evaluating the subsets of model-feature pairs 161, namely, scatter separability and maximum likelihood (ML). The former is not suitable for temporal data because multi-dimensional Euclidean distance does not take into account temporal dependency. In addition, it is non-trivial to define a proper distance measure for temporal data. The latter is known to be biased against higher-dimensional feature sets.

Therefore, we apply the normalized BIC 170

$$\widetilde{BIC} = \tilde{L} \cdot \lambda - \frac{1}{2} |\Theta| \log(T)$$

as an alternative to ML, which trades off the normalized data likelihood $\tilde{L}$ with the model complexity. The former has the weighting factor $\lambda$, and the latter is modulated by the total number of samples log(T). The data likelihood is determined in the same forward-backward iterations, except all the emission probabilities P(X|Q) are replaced with $P'_{X,Q} = P(X|Q)^{1/D}$, i.e., normalized with respect to data dimension D, under the naive-Bayes assumption that features are independent given the hidden states.

Initialization and convergence issues exist in the iterative partitioning of the feature pool 103. The strategy for generating the random reference set $\tilde{F}_i$ 121 in step 120 affects the result of feature partition, as even producing the same reference set in a different sequence may result in different final partitions. Moreover, the expressiveness or dimensionality of the resulting structures is also affected by the reference set.

If the dimension of the reference set $\tilde{F}_i$ is too low, then the process tends to produce many small feature groups where features in the same group mostly agree with each other. In this case, the learned model may not be able to identify potential complex structures that must be identified with features carrying complementary information, such as features from different modalities (audio and video).

On the other hand, if $\tilde{F}_i$ is of a very high dimension, then the information gain criterion gives a large feature group around $\tilde{F}_i$, thus mixing different event streams that would better be modeled separately, such as the activity of pedestrians and vehicles in a street surveillance video.

Hierarchical Hidden Markov Models

The preferred embodiment uses the two level hierarchical hidden Markov model (HHMM) 200 for the structures of a video 101. A top level includes the Markov chain, and a bottom level includes the hidden Markov models. The HHMM model is a special case of a dynamic Bayesian networks (DBN). The model can be extended to more than two levels.

In this model, the top-level structure elements correspond to semantic events in the video, while the bottom-level states represent variations that can occur within the same event. The bottom-level states are produced from observations, i.e., measurements of features taken from the raw video with mixture-of-Gaussian distributions. However, the feature distributions do not necessarily have to be constrained to mixture-of-Gaussian distributions.

Figure 2:
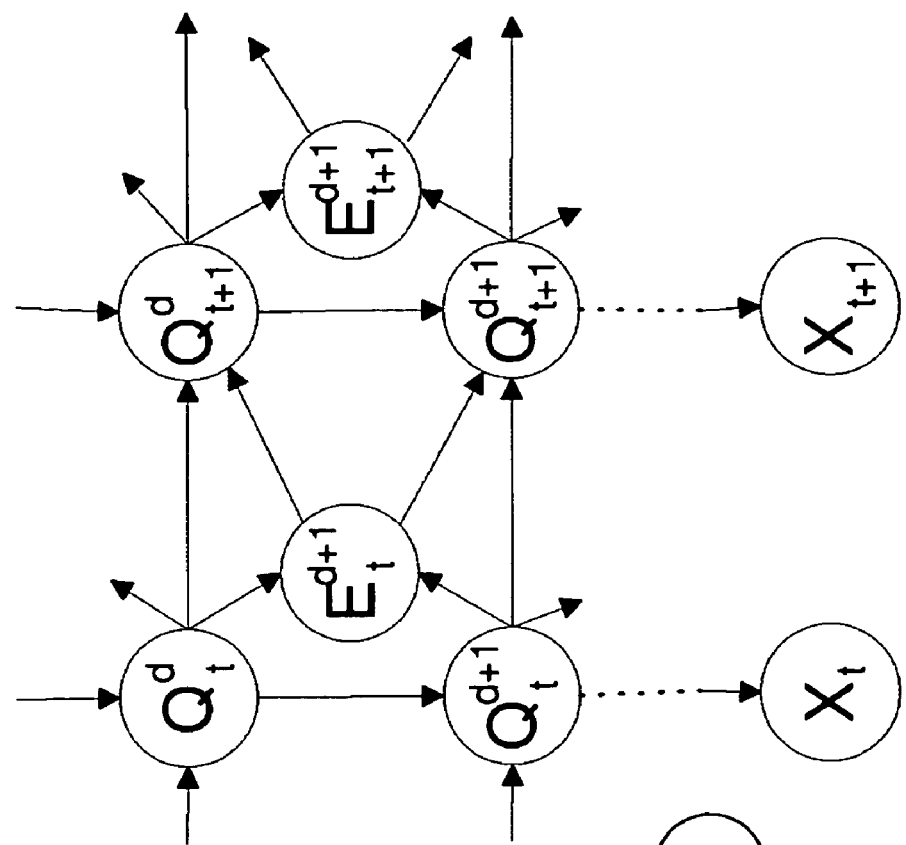
FIG. 2 is a hierarchical hidden Markov model used to model video structures according to the invention.
Figure 3:
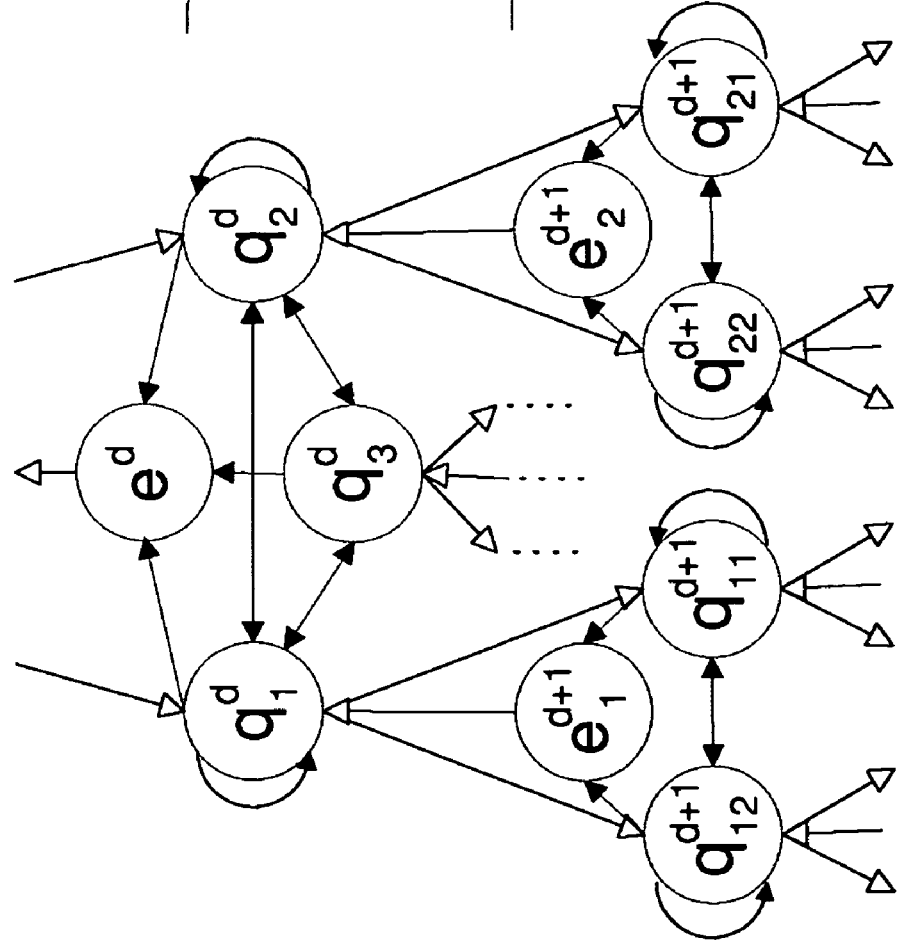
FIG. 3 is a dynamic Bayesian network representation of the model of FIG. 2.

FIG. 2 shows a tree-structured representation of the hierarchical hidden Markov model 200, and FIG. 3 shows a DBN representations for the same model with observations $X_t$ at the bottom. The HHMM 200 is a natural generalization of HMMs with hierarchical control structure. Every higher-level state symbol corresponds to a stream of symbols produced by a lower-level sub-HMM.

A transition at a high level of the model is invoked only when a lower-level of the model enters an exit (e or E) state. The exit states turn on transitions at a higher level. Observations are only produced at the lowest level states. Upper-case letters denote the states as random variables in time t, lowercase letters denote the state-space of HMMs, i.e., values the random variables can take in any time interval. A state at level d is not allowed to change unless the exiting states in the levels below are on, i.e., $E^{d+1}=1$.

This bottom-up structure is general in that it includes several other hierarchical schemes as special cases. Examples include: a stacking of left-right HMMs, where across-level transitions can only happen at the first or the last state of a lower-level model, and a discrete counterpart of the jump Markov model with top-down, rather than bottom-up, control structure, where the level-transition probabilities are identical for each state that belongs to the same parent state at a higher level.

Prior applications of HHMM falls into three categories: supervised learning, unsupervised learning, and a mixture of both. In supervised learning, the training data is manually segmented and labeled. Hence, each sub-HMM is learned separately on the segments, and cross-level transitions are learned using the transition statistics across the segments. Examples include extron/intron recognition in DNA sequences and action recognition. In unsupervised learning, segmented data at any level are not available for training, and parameters of different levels are jointly learned. In a mixture of the above, the state labels at the high level are given, with or without sub-model boundaries, yet parameters still needs to be estimated across several levels. The most common applications here are speech and handwriting recognition.

Multi-level hidden state inference can be done by looping over all possible lengths of subsequences generated by each Markov model at each level. However, this process is less than optimal. For simplicity, we prefer a generalized forward-backward process for hidden state inference, and a generalized EM process for parameter estimation based on the forward-backward iterations.

The purpose of the EM process is to establish the correct model parameters. We assume that an initial size of the model is given, and the model is learned over a pre-defined feature set. These two assumptions are relaxed using an adaptive model selection process and an adaptive feature selection process as described herein.

We denote a maximum state-space size of any sub-HMM as N. We use a bar notation to write an entire configuration of hierarchical states from the top (level 1) to the bottom (level D) with a N-ary D-digit integer, with the lowest-level states at the least significant digit $$k^{(D)} = q1:D = \overline{(q_1 q_2 \ldots q_D)} = \sum_{i=1}^{D} q_i \cdot N^{D-i}$$

Here, $1 \leq q_i \leq N$, $i=1, \ldots, D$. We drop the superscript of k where there is no confusion. The parameters of the HHMM, which essentially define the model 200, include the Markov chain parameters $\lambda^d$ in level d indexed by the state configuration $k^{(d-1)}$, i.e., transition probabilities $A_k^d$, prior probabilities $\pi_k^d$, exiting probabilities from the current level $e_k^d$, and emission parameters B specify a distribution of observations conditioned on the state configuration, i.e., the means $\mu_k$ and covariances $\sigma_k$ when the observations are Gaussian distributed $$\Theta = \left(\bigcup_{d=1}^{D} \{\lambda^d\}\right) \cup \{B\}$$

$$= \left(\bigcup_{d=1}^{D} \bigcup_{i=1}^{N^{d-1}} \{A_i^d, \pi_i^d, e_i^d\}\right) \cup \left(\bigcup_{i=1}^{N^D} \{\mu_i, \sigma_i\}\right).$$

Expectation Maximization

The current parameter set is $\Theta$, and the proposed or updated parameter set is $\hat{\Theta}$. Maximizing a data likelihood L is equivalent to iteratively maximizing the expected value of the complete-data log-likelihood function $(\Omega(.,\Theta)$. We use the notation $(.)_{1:T}$ to write an element of a temporal sequence of length T.

$$\Omega(\hat{\Theta}, \Theta) = E[\log(P(Q_{1:T}, X_{1:T} | \hat{\Theta})) | X_{1:T}, \Theta]$$

$$= \sum_{Q_{1:T}} P(Q_{1:T} | X_{1:T}, \Theta) \log(P(Q_{1:T}, X_{1:T} | \hat{\Theta}))$$

Generally speaking, the expectation step evaluates the expectation based on the current parameter set. The maximization step finds the parameters $\hat{\Theta}$ that maximize this expectation. Special care must be taken in selecting a proper hidden state space so that the maximization step has a closed form solution. Because all the unknowns lie inside the $\log(\cdot)$. If the complete-data probability takes the form of product-of-unknown-parameters, then each unknown can be solved separately in maximization, and a close-form solution is possible.

Bayesian Adaptation

Using EM parameter learning for HHMMs converges to a local maximum of the data likelihood because EM is an hill-climbing process. Searching for a global maximum in the likelihood space is intractable. Moreover, this optimization for data likelihood is only carried out over a predefined model structure. In order to enable the comparison and search over a set of model structures, we need a new optimality criterion, and an alternative search strategy because exhausting all model topologies is super-exponential in complexity.

We use a randomized search strategy to address the intractability search problem on the entire parameter and model structure space. The optimality criteria are generalized from maximum likelihood to a maximum posterior probability. Thus, we incorporate the Bayesian prior belief in the model structure.

Specifically, we use the Markov chain Monte Carlo (MCMC) method 170 to maximize the Bayesian information criteria (BIC) 170.

We are aware that alternatives for learning structure are known, such as deterministic parameter trimming algorithm with an entropy prior probability, which ensures the monotonic increasing of model prior probabilities throughout the trimming process. However, we would have to start with a sufficiently large model in order to apply that trimming process. That is undesirable for computational complexity purposes, and it is impossible if we do not know a bound of the model complexity beforehand, as would be the case in an unsupervised setting.

MCMC

MCMC is a class of methods that can be used to solve high-dimensional optimization problems, In general, MCMC for Bayesian learning iterates between two steps. A proposal step generates an updated model sampled from certain proposal distributions, which depend on the current model and statistics of the features. A decision step computes an acceptance probability $\alpha$ based on the fitness of the proposed model using model posterior and proposal strategies. The proposed model is accepted or rejected with probability $\alpha$.

MCMC converges to a global optimum in probability when certain constraints are satisfied for the proposal distributions. The speed of convergence depends largely on the 'goodness' of the proposals. In addition to parameters learning, model selection can also be addressed in the same framework with reverse-jump MCMC (RJ-MCMC) by constructing reversible moves between parameter spaces of different dimensions.

We use the MCMC scheme to learn the optimal state space of the HHMM model 200. We use a mixture of the EM and MCMC procedures, where the model parameters are updated using EM, and the learning of model structure uses MCMC. We prefer this hybrid process in place of a full Monte Carlo update of the parameter set and the model, because the MCMC update of the parameters takes much longer than EM. With the hybrid approach, convergence does not suffer.

MCMC for HHMM

We update the HHMM using four general types of 'moves' in the state space.

An EM move updates the parameters without changing the size of the state space.

A Split(d) move splits a state at level d. This is done by randomly partitioning the immediate children of a node, when there are more than one, of a state at level d into two sets, assigning one set to its original parent node, the other set is assigned to a newly generated parent state at level d. When the split happens at the lowest level, i.e., d=D, we split the Gaussian kernel of the original observation probabilities by perturbing the mean.

A Merge(d) move merges two states at level d into one, by collapsing their children into one set and decreasing the number of nodes at level d by one.

A Swap(d) move swaps the parents of two states at level d, whose parent nodes at level d−1 were originally different. This move is needed for HHMM, because its multi-level structure is non-homogeneous within the same size of overall state-space.

We do not have add and delete moves because these moves can be reached with multiple split and merge moves.

Figure 4:
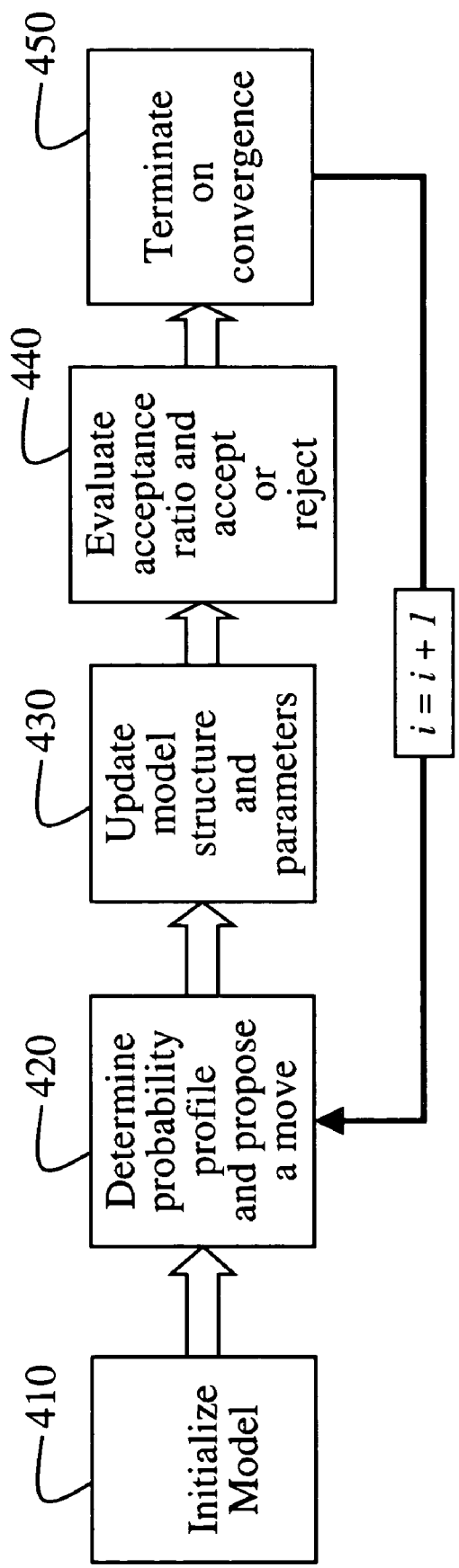
FIG. 4 is a flow diagram of a model adaptation procedure according to the invention.

FIG. 4 shows the model adaptation process. In step 410, we initialize the current model 200. At iteration i, based on the current model determine 420 a proposed probability profile, as described in the Appendix. Then, propose a move among the types {EM, Split(d), Merge(d), Swap(d)| d=1, ..., D}.

The model and its parameters are updated 430 by appropriate action on selected states and their children states, as described in the Appendix. An acceptance ratio $r_i$ is evaluated 440 for different types of moves, see the Appendix. This ratio takes into account the model's posterior probability, determined with BIC, and alignment terms that compensates for the fact that the spaces we are evaluating the ratio between are of unequal sizes. We denote the acceptance probability $\alpha_i=\min\{1, r_i\}$. Then, we sample u~U(0, 1), and accept the move if $u \leq \alpha_i$, and reject otherwise. Terminate 450 if the model and parameters converge, otherwise iterate at step 420.

BIC is a measure of a posteriori model fitness. It is the major factor that determines whether or not a proposed move is accepted.

$$BIC = \log(P(x \mid \Theta)) \cdot \lambda - \frac{1}{2} |\Theta| \log(T)$$

Intuitively, BIC is a trade-off between data likelihood $P(X|\Theta)$ and model complexity $|\Theta| \cdot \log(T)$, with a weighting factor $\lambda$. The number of free parameters in the model penalizes larger models. The influence of the model penalty decreases as the amount of training data T increases, because log(T) increases relatively slow. We empirically select the weighting factor $\lambda$ as 1/16. This way, the change in data likelihood and the model prior probability is numerically comparable over one iteration.

Applications

The method according to our invention can automatically find salient events, learn model structures, and identify informative feature set in soccer and baseball videos. Sports videos represent an interesting domain for the invention. Two main factors contribute to this match in the video domain and the statistical technique. The distinct set of semantics in one sport domain exhibits strong correlations with audio-visual features. The well-established rules of games and production syntax in sports videos provide strong temporal transition constraints. For example, in soccer videos, plays and breaks are recurrent events covering the entire time axis of the video data. In baseball videos, transitions among different perceptually distinctive midlevel events, such as pitching, batting, running, indicate the semantics of the game.

For soccer videos, it is desired to discover the structure that models two semantic events, play and break, defined according to the rules of soccer game. These two events are dense because they cover the whole time scale of the video, and distinguishing break from play is useful for efficient browsing and summarization, because break takes up about 40% of the video, and viewers may browse through the game play by play, skipping all the breaks in between, or randomly access the break segments to find player responses or game announcements.

For baseball videos, the learning is performed without having a labeled ground truth or manually identified features a priori. This is an application of structure discovery to an unknown domain, where evaluation and interpretation of the result are done after the automatic discovery method is applied.

Test results show that the performance of our unsupervised learning method is comparable to supervised learning, and sometimes achieves better accuracy, e.g., 75.2%-75.7% for unsupervised vs. 75.0% for supervised. This is quite surprising because the unsupervised learning of the HHMMs is not tuned to a particular ground-truth. The test results maintain a consistent as indicated by a low semi-interquartile range of 1.1%-1.2%.

For the HHMM with full model adaptation, the method converges to two to four high-level states, and the evaluation is done by assigning each resulting cluster to the corresponding majority ground-truth label.

Based on the good performance of the model parameters and structure learning method, the performance of the automatic feature selection method that iteratively wraps around for each remaining feature, and filters was tested. A nine-dimensional feature vector sampled at every 0.1 seconds fills the initial feature pool 401. The feature vector includes:

Dominant Color Ratio (DCR),

Motion Intensity (MI),

Leastsquare estimates of camera translation (MX, MY),

Audio Volume,

Spectral Roll-off (SR),

Low-band Energy (LE),

High-band Energy (HE), and

Zero-Crossing Rate (ZCR).

For one soccer video and a selected feature set {DCR, Volume}, the model converges to two high-level states in the HHMM, each with five lower level children states. Evaluation against the play/break labels show a 74.8% accuracy. For another soccer video and a selected feature set {DCR, MX}, three high-level states and {7, 3, 4} children states are produced. MX is a feature that approximates the horizontal camera panning motion, which is the most dominant factor contributing to the overall motion intensity in soccer video, as the camera needs to track the ball movement in wide angle shots, and wide angle shots are one major type of shot that reveals the overall status of the game.

EFFECT OF THE INVENTION

Our invention provides a method for learning the structure of a video in an unsupervised manner. We model a class of dense, stochastic structures of the video with hierarchical hidden Markov models. The models parameters and model structure are learned using EM and Monte Carlo sampling techniques. Informative feature subsets are selected automatically from a large feature pool using an iterative filter-wrapper process. When evaluated on soccer videos, the invention achieves comparable results as a supervised learning method. When evaluated on baseball videos, the method automatically selects two visual features, which agrees with our intuition that the status of a baseball game can be inferred from visual information only.

It is to be understood that various other adaptations and modifications may be made within the spirit and scope of the invention. Therefore, it is the object of the appended claims to cover all such variations and modifications as come within the true spirit and scope of the invention.

APPENDIX

Proposal Probabilities for Model Adaptation $p_{sp}(k,d) = c^* \cdot \min\{1, p/(k+1)\};$ $p_{me}(k,d) = c^* \cdot \min\{1, (k-1)/p\};$ $p_{sw}(k,d) = c^*;$ $d = 1, \ldots, D;$ $p_{em}(k) = 1 - \Sigma_{d=1}^{D}[p_{sp}(k,d) + p_{me}(k,d) + p_{sw}(k,d)].$ Here, $c^*$ is a simulation parameter, and k is the current number of states. The parameter p is the hyper-parameter for the truncated Poisson prior probability of the number of states, i.e., p is the expeected mean of the number of states if the maximum state size is allowed to be $+\infty$, and the scalign factor that multiples $c^*$ modulates the probability using the resulting state-space size $k \pm 1$ and p.

Determining Different Moves in RJ-MCMC

Expectation maximization (EM) is one regular hill-climbing iteration. Ater a move type other than EM is selected, one or two states at a certain level are selected at random for swap/split/merge, and the parameters are modified accordingly.

Swap the Association of Two States:

Choose two states from the same level, each of which belongs to a different higher-level state; swap their higher-level association.

Split a State

Choose a state at random. The split strategy differs when this state is at different position in the hierarchy: when this state is at the lowest level (d=D), perturb the mean of its associated Gaussian observation distribution as follows $\mu_1 = \mu_0 + \mu_s \eta$ $\mu_2 = \mu_0 - \mu_s \eta$ where $\mu_s \sim U[0, 1]$, and $\eta$ is a simulation parameter that ensures reversability between split moves and merge moves. When this is a state at $d=1, \ldots D-1$, with more than one children states, split its children into two disjoint sets at random, generate a new sibling state at level d associated with the same parent as the selected state. Update the corresponding multi-level Markov chain parameters accordingly.

Merge Two States

Select two sibling states at level d, merge the observation probabilities or the corresponding child-HHMM of these two states, depending on which level they are located at the original HHMM: When d=D, merge the Gaussian obseravation probabilities by making the new mean as the average of the two.

$\mu_0 = \dfrac{\mu_1 + \mu_2}{2},$ if $|\mu_1 - \mu_2| \leq 2\eta.$

When $d=1, \ldots, D-1$, merge the two states by making all the children of these two states the children of the merged state, and modify the multi-level transition probabilities accordingly.

Acceptance Ratio for Different Moves in RJ-MCMC the acceptance ratio for Swap simplifies into the prosterior ratio because the dimension of the space does not change. Denote $\Theta$ as the old model and $\hat{\Theta}$ as the new model:

$r \triangleq \text{(posterior ratio)} = \dfrac{P(x | \hat{\Theta})}{P(x | \Theta)} = \dfrac{\exp(\hat{BIC})}{\exp(BIC)}.$ When moves are proposed to a parameter space with different dimension, such as split or merge, we will need two additional terms in evaluating the acceptance ratio: a proposal ratio term to compensate for the probability that the current proposal is actually reached to ensure detailed balance; and a Jacobian term is used to align the two spaces.

Here, $p_{sp}(k)$ and $p_{ms}(k)$ refer to the proposal probabilities, see above, with the extra variable d omitted because split or merge moves do not involve any change across levels.

We claim:

1. A method for learning a structure of a video to detect events in the video consistent with the structure, comprising:
    selecting sets of features from the video;
    updating a hierarchical hidden Markov model for each set of features;
    evaluating an information gain of the hierarchical hidden Markov model;
    filtering redundant features;
    updating the hierarchical hidden Markov model based on the filtered features;
    applying a Bayesian information criteria to each hierarchical hidden Markov model and feature set pair; and
    rank ordering the hierarchical hidden Markov model and feature set pairs to learn the structure and detect the events in the video in an unsupervised manner.

2. The method of claim 1, in which the hierarchical statistical model uses Gaussian mixtures.

3. The method of claim 1, in which states of events in the video are modeled as low-level hidden Markov models in the hierarchical hidden Markov model, and the events are modeled as a high-level Markov chain in the hierarchical hidden Markov model.

4. The method of claim 1, in which the features include dominant color ratios, motion intensity, least-square estimates of camera translation, audio volume, spectral roll-off, low-band energy, high-band energy, zero-crossing rate (ZCR).

5. The method of claim 1, in which the features are filtered with a Markov blanket.

6. The method of claim 1, in which the evaluating is performed using expectation maximization and a Markov chain Monte Carlo method.

* * * * *